United States Patent
Graham et al.

(10) Patent No.: US 9,717,068 B2
(45) Date of Patent: Jul. 25, 2017

(54) SYSTEM AND METHOD FOR SUPPORTING CELL UPDATES WITHIN A SMALL CELL CLUSTER FOR IDLE MOBILITY IN CELL PAGING CHANNEL MODE

(71) Applicant: CISCO TECHNOLOGY, INC., San Jose, CA (US)

(72) Inventors: Mickael Graham, Bellevue Hill (AU); Anton Okmyanskiy, Vancouver (CA); James Briers, Swindon (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 506 days.

(21) Appl. No.: 14/481,654

(22) Filed: Sep. 9, 2014

(65) Prior Publication Data

US 2016/0073285 A1  Mar. 10, 2016

(51) Int. Cl.
| | |
|---|---|
| H04W 68/02 | (2009.01) |
| H04W 60/04 | (2009.01) |
| H04W 36/02 | (2009.01) |
| H04W 76/04 | (2009.01) |
| H04W 84/04 | (2009.01) |

(52) U.S. Cl.
CPC ......... *H04W 68/02* (2013.01); *H04W 36/023* (2013.01); *H04W 60/04* (2013.01); *H04W 76/046* (2013.01); *H04W 84/045* (2013.01)

(58) Field of Classification Search
CPC ............. H04W 84/105; H04W 84/045; H04W 28/0226; H04W 76/046
See application file for complete search history.

(56) References Cited

U.S. PATENT DOCUMENTS 6,483,820 B1  11/2002  Davidson et al.
7,379,739 B2  5/2008  Rajkotia et al.
(Continued)

FOREIGN PATENT DOCUMENTS

CN  102378288  3/2012
CN  105050072 A  11/2015
(Continued)

OTHER PUBLICATIONS

3GPP TS 25.2467 V11.1.0, Dec. 2012.*
(Continued)

*Primary Examiner* — Robert M Morlan
*Assistant Examiner* — Mandish Randhawa
(74) *Attorney, Agent, or Firm* — Patent Capital Group

(57) ABSTRACT

An example method is provided in one example embodiment and may include assigning an identifier to each of a plurality of Home Node Bs (HNBs); receiving a cell update for a user equipment (UE) transitioning from a first HNB to a second HNB, wherein the cell update for the UE includes a first identifier associated with the first HNB and wherein the UE is in a cell paging channel (PCH) mode; determining based, at least in part, on the first identifier associated with the first HNB, whether the first HNB is operating within a cluster of HNBs including the second HNB; and withholding registration of the cell update for the UE with an HNB gateway (HNB-GW) if the first HNB is operating within the cluster of HNBs including the second HNB until packet switched (PS) traffic for the UE is received by the second HNB.

20 Claims, 8 Drawing Sheets

(56) References Cited

U.S. PATENT DOCUMENTS

| | | |
|---|---|---|
| 7,983,667 B2 | 7/2011 | Hart et al. |
| 8,107,950 B2 | 1/2012 | Amerijoo et al. |
| 8,320,965 B2 | 11/2012 | Kwun |
| 8,340,711 B1 | 12/2012 | Glass et al. |
| 8,588,698 B2 | 11/2013 | Brisebois |
| 8,611,299 B2 | 12/2013 | Yang et al. |
| 8,639,243 B2 | 1/2014 | Radulescu et al. |
| 8,712,459 B2 | 4/2014 | Lim et al. |
| 8,792,886 B2 | 7/2014 | Meshkati |
| 8,830,936 B2 | 9/2014 | Ren |
| 8,917,658 B2 | 12/2014 | Bjork |
| 9,219,816 B2 | 12/2015 | Grayson et al. |
| 9,226,255 B2 | 12/2015 | Grayson et al. |
| 9,350,737 B2 | 5/2016 | Fernandez Alonso |
| 2005/0036462 A1 | 2/2005 | Sillasto et al. |
| 2006/0229087 A1 | 10/2006 | Davis et al. |
| 2007/0008885 A1 | 1/2007 | Bonner |
| 2009/0137246 A1 | 5/2009 | Xing |
| 2009/0305684 A1 | 12/2009 | Jones |
| 2010/0056184 A1 | 3/2010 | Vakil |
| 2010/0112982 A1 | 5/2010 | Singh et al. |
| 2010/0124929 A1 | 5/2010 | Lee |
| 2010/0135237 A1 | 6/2010 | Papasakellariou |
| 2010/0157922 A1 | 6/2010 | Kim et al. |
| 2010/0182955 A1 | 7/2010 | Bjork |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0279628 A1 | 11/2010 | Love et al. |
| 2011/0110316 A1 | 5/2011 | Chen et al. |
| 2011/0128913 A1 | 6/2011 | Chowdury |
| 2011/0130144 A1 | 6/2011 | Schein |
| 2011/0170481 A1 | 7/2011 | Gomes |
| 2011/0177817 A1 | 7/2011 | Hole |
| 2011/0201333 A1 | 8/2011 | Kwon |
| 2011/0211514 A1 | 9/2011 | Hamalainen |
| 2011/0237283 A1 | 9/2011 | Shan et al. |
| 2011/0267967 A1 | 11/2011 | Ratasuk |
| 2011/0314178 A1 | 12/2011 | Kanode |
| 2012/0004003 A1 | 1/2012 | Shaheen et al. |
| 2012/0015653 A1 | 1/2012 | Paliwal |
| 2012/0100849 A1 | 4/2012 | Marsico |
| 2012/0129537 A1 | 5/2012 | Liu et al. |
| 2012/0191842 A1 | 7/2012 | Hu et al. |
| 2012/0210003 A1 | 8/2012 | Castro |
| 2012/0258720 A1 | 10/2012 | Tinnakornsrisuphap et al. |
| 2012/0260299 A1 | 10/2012 | Kotecha |
| 2012/0265888 A1 | 10/2012 | Roeland et al. |
| 2012/0269167 A1 | 10/2012 | Velev |
| 2012/0276913 A1 | 11/2012 | Lim |
| 2012/0290452 A1 | 11/2012 | Pancorbo Marcos |
| 2012/0327850 A1 | 12/2012 | Wang et al. |
| 2013/0003697 A1 | 1/2013 | Adjakple et al. |
| 2013/0077482 A1 | 3/2013 | Krishna et al. |
| 2013/0114484 A1 | 5/2013 | Suzuki |
| 2013/0132570 A1 | 5/2013 | Lopez Nieto |
| 2013/0136072 A1 | 5/2013 | Bachmann et al. |
| 2013/0139221 A1 | 5/2013 | Gundavelli |
| 2013/0155948 A1 | 6/2013 | Pinheiro |
| 2013/0155954 A1 | 6/2013 | Wang et al. |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0235759 A1 | 9/2013 | Meshkati |
| 2013/0294356 A1 | 11/2013 | Bala et al. |
| 2013/0308531 A1 | 11/2013 | So et al. |
| 2013/0326001 A1 | 12/2013 | Jorgensen et al. |
| 2013/0337769 A1 | 12/2013 | Bhatia |
| 2013/0337821 A1 | 12/2013 | Clegg |
| 2013/0339783 A1 | 12/2013 | Alonso et al. |
| 2013/0343288 A1 | 12/2013 | Ratasuk et al. |
| 2013/0343304 A1 | 12/2013 | Kaippallimalil et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0016629 A1 | 1/2014 | Pancorbo Marcos |
| 2014/0078986 A1 | 3/2014 | Kaippallimalil et al. |
| 2014/0086226 A1 | 3/2014 | Zhao et al. |
| 2014/0094139 A1 | 4/2014 | Xu |
| 2014/0112251 A1 | 4/2014 | Kim et al. |
| 2014/0126453 A1 | 5/2014 | Park |
| 2014/0146732 A1 | 5/2014 | Olufunmilola et al. |
| 2014/0155109 A1 | 6/2014 | Vaidya et al. |
| 2014/0177583 A1 | 6/2014 | Aso |
| 2014/0185537 A1 | 7/2014 | Papasakellariou |
| 2014/0187245 A1 * | 7/2014 | Xu .................. H04W 36/0016 455/436 |
| 2014/0241316 A1 | 8/2014 | Okmyanskiy et al. |
| 2014/0254367 A1 | 9/2014 | Jeong |
| 2014/0287759 A1 | 9/2014 | Purohit |
| 2014/0287769 A1 | 9/2014 | Taori |
| 2014/0297888 A1 | 10/2014 | McCann |
| 2014/0301351 A1 | 10/2014 | Gao |
| 2014/0307589 A1 | 10/2014 | Li |
| 2014/0321328 A1 | 10/2014 | Zuniga |
| 2014/0328266 A1 | 11/2014 | Yu |
| 2014/0342745 A1 | 11/2014 | Bhushan |
| 2014/0378131 A1 | 12/2014 | Rui |
| 2015/0009826 A1 | 1/2015 | Ma |
| 2015/0044989 A1 | 2/2015 | De Foy |
| 2015/0055588 A1 | 2/2015 | Yerramalli et al. |
| 2015/0063101 A1 | 3/2015 | Touati |
| 2015/0103768 A1 | 4/2015 | Chen |
| 2015/0103772 A1 | 4/2015 | Carnero Ros |
| 2015/0117347 A1 | 4/2015 | Iwai |
| 2015/0146594 A1 | 5/2015 | Grayson |
| 2015/0148036 A1 * | 5/2015 | Grayson .................. H04W 8/06 455/435.1 |
| 2015/0172471 A1 | 6/2015 | Castro |
| 2015/0181577 A1 | 6/2015 | Moulsley |
| 2015/0200760 A1 | 7/2015 | Xia |
| 2015/0208403 A1 | 7/2015 | Takeda |
| 2015/0222634 A1 | 8/2015 | Ludwig |
| 2015/0245241 A1 | 8/2015 | Posz |
| 2015/0264652 A1 | 9/2015 | Zhang |
| 2015/0296516 A1 | 10/2015 | Jung |
| 2015/0365931 A1 | 12/2015 | Ng et al. |
| 2015/0382386 A1 | 12/2015 | Castro Castro |
| 2016/0007170 A1 | 1/2016 | Vaidya et al. |
| 2016/0007316 A1 | 1/2016 | Vaidya et al. |
| 2016/0007378 A1 | 1/2016 | Bertorelle |
| 2016/0037490 A1 | 2/2016 | Pazhyannur et al. |
| 2016/0037550 A1 | 2/2016 | Barabell |
| 2016/0073282 A1 | 3/2016 | Speicher |
| 2016/0073283 A1 | 3/2016 | Grayson et al. |
| 2016/0073328 A1 | 3/2016 | Li |
| 2016/0094976 A1 | 3/2016 | Enomoto |
| 2016/0099794 A1 | 4/2016 | Chendamari |
| 2016/0105882 A1 | 4/2016 | Park |
| 2016/0127137 A1 | 5/2016 | Fernandez Alonso |
| 2016/0134761 A1 | 5/2016 | Campbell et al. |
| 2016/0135143 A1 | 5/2016 | Won et al. |
| 2016/0156729 A1 | 6/2016 | Essigmann |
| 2016/0165494 A1 | 6/2016 | Warburton et al. |
| 2016/0191631 A1 | 6/2016 | Haraszti |
| 2016/0226669 A1 | 8/2016 | Livanos et al. |
| 2016/0227428 A1 | 8/2016 | Novlan et al. |
| 2016/0234706 A1 | 8/2016 | Liu et al. |
| 2016/0234763 A1 | 8/2016 | Um et al. |
| 2016/0242203 A1 | 8/2016 | You |
| 2016/0262041 A1 | 9/2016 | Ronneke |
| 2016/0295357 A1 | 10/2016 | Grayson et al. |
| 2016/0295521 A1 | 10/2016 | Grayson et al. |

FOREIGN PATENT DOCUMENTS

| | | |
|---|---|---|
| CN | 105307279 | 2/2016 |
| CN | 105407509 | 3/2016 |
| CN | 105407540 | 3/2016 |
| CN | 105592460 | 5/2016 |
| EP | 2234422 | 9/2010 |
| EP | 2453700 | 5/2012 |
| EP | 2466831 | 6/2012 |

(56) References Cited

FOREIGN PATENT DOCUMENTS

| | | |
|---|---|---|
| EP | 2757850 | 7/2014 |
| EP | 2981119 | 2/2016 |
| EP | 2993868 | 3/2016 |
| EP | 2996386 | 3/2016 |
| EP | 3029988 | 6/2016 |
| EP | 3046386 | 7/2016 |
| WO | WO2009/025601 | 2/2009 |
| WO | WO2011/002958 | 1/2011 |
| WO | WO2011/085238 | 7/2011 |
| WO | WO2011/134529 | 11/2011 |
| WO | WO2012/055984 | 5/2012 |
| WO | WO2012/135121 | 10/2012 |
| WO | WO2013/041574 | 3/2013 |
| WO | WO2013/082245 | 6/2013 |
| WO | WO2013/086659 | 6/2013 |
| WO | WO2013/169991 | 11/2013 |
| WO | WO2014/051606 | 4/2014 |
| WO | WO2014/177208 | 11/2014 |
| WO | WO2016/126413 | 8/2016 |
| WO | WO2016/126414 | 8/2016 |

OTHER PUBLICATIONS

"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex-France, Mar. 2011; See Section 4-6, pp. 14-116.
"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-France, Jul. 2014.
"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex-France, Sep. 2014.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex-France, Jun. 2014; See Sections 1-5, pp. 11-76.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex-France, Nov. 2014.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.
"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-France, Jul. 2014; Section 4, pp. 17-88.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex-France, May 2014, 64 pages.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 32.522 v11.2.0, 3rd Generation Partnership Project Technical Specification: Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

(56) References Cited

OTHER PUBLICATIONS

3GPP TSG-RAN WG3 #61bis, R3-081174, "Solution for interference reduction SON use case," Orange, Alcatel-Lucent, Agenda Item 10.1.1c; Kansas City, MO, USA; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex-France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex-France, Oct. 2014, 232 pages.
"ETSI TS 129 213 V12.5.0 (Oct. 2014) Technical Specification: Digital Cellular Telecommunications Systems (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex-France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex-France, Oct. 2014; 64 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].
"ETSI TS 125 469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," © European Telecommunications Standards Institute 2013; Apr. 2013; 78 pages.
"ETSI TS 125 469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.
"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.
"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"Broadband Forum Technical Report: TR-196 Femto Access Point Service Data Model," Issue: 1, Issue Date: Apr. 2009, © The Broadband Forum; 131 pages.
Broadband Forum, "TR-069 CPE WAN Management Protocol," Broadband Forum Technical Report, Issue: 1 Amendment 4, Issue Date: Jul. 2011, Protocol Version 1.3, © The Broadband Forum. All Rights Reserved; 190 pages.
Broadband Forum, "TR-196 Femto Access Point Service Data Model," Broadband Forum Technical Report, Issue 2, Issue Date: Nov. 2011, © The Broadband Forum. All Rights Reserved; 46 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Extensible Authentication Protocol," Wikipedia, the free encyclopedia, Sep. 16, 2013, 10 pages http://en.wikipedia.org/wiki/Extensible_Authentication_Protocol#EAP-FAST.
"Link Layer Discovery Protocol," Wikipedia, the free encyclopedia, Sep. 25, 2013, 4 pages, http://en.wikipedia.org/wiki/Link_Layer_Discovery_Protocol.
"RADIUS," Wikipedia, the free encyclopedia, Sep. 26, 2013, 12 pages http://en.wikipedia.org/wiki/RADIUS.
Ashraf, Imran, "Distributed Radio Coverage Optimization in Enterprise Femtocell Networks," International Conference on Communications ICC 2010, May 23-27, 2010, Cape Town, South Africa; 6 pages.
Calhoun, P., "Diameter Base Protocol," Network Working Group RFC 3488, Sep. 2003; 147 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Horn, Gavin, "3GPP Femtocells: Architecture and Protocols," Qualcomm Incorporated, 5775 Morehouse Drive, San Diego, CA, Sep. 2010; 64 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
EPO Dec. 15, 2015 Extended Search Report and Written Opinion from European Application Serial No. 15178914.6.
Ratasuk, Rapeepat, et al., "License-exempt LTE Deployment in Heterogeneous Network," 2012 International Symposium on Wireless Communications Systems (ISWCS), Aug. 28, 2012, pp. 246-250.
Almeida, Erika, et al., "Enabling LTE/Wifi Coexistence by LTE Blank Subframe Allocation," 2013 IEEE International Conference on Communications (ICC), Jun. 9, 2013, pp. 5083-5088.
Saad, Sawsan A., et al., "A Survey on Power Control Techniques in Femtocell Networks," Journal of Communications vol. 8, No. 12, Dec. 2013; 10 pages.
EPO Feb. 8, 2016 Extended Search Report and Written Opinion from European Application Serial No. 15183583.2.

(56) References Cited

OTHER PUBLICATIONS

3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.
3GPP TSG-RAN3 Meeting #69 R3-102094, "Text Proposal for HNBRAP," Alcatel-Lucent, 3GPP Draft, Madrid, Spain, Aug. 23-27, 2010; 62 pages.
"LTE Quick Reference: CCE Index Calculation," LTE Handbook, Share Technote, http://www.sharetechnote.com/html/Handbook_LTE_CCE+Index.html First published on or about Jul. 8, 2012.
EPO Jan. 29, 2016 Extended Search Report and Written Opinion from European Application Serial No. 15180616.
Gundavelli, M., et al., "Multiple APN Support for Trusted Wireless LAN Access," NETEXT-WG Internet Draft, draft-gundavelli-netext-multiple-apn-pmipv6-01.txt, Feb. 22, 2012; 15 pages.
"3GPP TS 23.402 V12.5.0 (Jun. 2014) Technical Specification: 3rd Generation Partnership Project; Technical Specification Group Services and System Aspects; Architecture enhancements for non-3GPP accesses (Release 12);" 3GPP, 650 Route des Lucioles; F-05921 Sophia-Antipolis Cedex, France; Jun. 2014; 291 pages.
SA-WG2 Meeting #92, S2-123194 (Revision of Sw-122735), Juniper Networks, Barcelona, Spain, Jul. 9-13, 2012; 13 pages.
EPO Mar. 11, 2016 Extended Search Report and Written Opinion from European Application Serial No. 15193713.
"3GPP TS 23.203 V7.3.0 (Jun. 1, 2007) Technical Specification: 3rd Generation Partnership Project; Group Services and System Aspects; Policy and charging control architecture (Release 7)," 3GPP, 650 Route des Lucioles; F-05921 Sophia-Antipolis Cedex, France; Jun. 1, 2007.
PCT Apr. 6, 2016 International Search Report and Written Opinion of the International Searching Authority from International Application No. PCT/US2016/013931.
"3GPP TS 29.213 V13.0.0 (Jan. 5, 2015) Technical Specification: 3rd Generation Partnership Project; Technical Specification Group Core Network and Terminals; Policy and Charging Control signalling flows and Quality of Service (QoS) parameter mapping (Release 13)," 3GPP, 650 Route des Lucioles; F-05921 Sophia-Antipolis Cedex, France; Jan. 5, 2015.
PCT Apr. 6, 2016 International Search Report and Written Opinion of the International Searching Authority from International Application No. PCT/US2016/013934.
3GPP TSG-CT WG3 Meeting #80, C3-150092, 29.213 CR0593, 3GPP Draft; Current Version 13.0.0; Huawei, et al.; Sorrento, Italy Feb. 2-6, 2015.
EPO Apr. 28, 2016 Extended Search Report and Written Opinion from European Application Serial No. 15195895.
EPO Jun. 7, 2016 Extended Search Report and Written Opinion from European Application Serial No. 16150351.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
U.S. Appl. No. 14/534,792, filed Nov. 6, 2014, entitled "System and Method for Providing Message Delivery and Paging to a Group of Users in a Network Environment," Inventors: Maulik Vijay Vaidya, et al.
U.S. Appl. No. 14/450,040, filed Aug. 1, 2014, entitled "System and Method for Media Access Control Scheduler for a Long Term Evolution Unlicensed Network Environment," Inventors: Rajesh S. Pazhyannur, et al.
U.S. Appl. No. 14/480,284, filed Sep. 8, 2014, entitled "System and Method for Internet Protocol Version-Based Multiple Access Point Name Support in a Network Environment," Inventors: Mark Grayson, et al.
U.S. Appl. No. 14/536,642, filed Nov. 9, 2014, entitled "System and Method for Radio Aware Traffic Management Based Wireless Authorization," Inventors: Ian McDowell Campbell, et al.
U.S. Appl. No. 14/534,883, filed Nov. 6, 2014, entitled "System and Method for Providing Message Delivery and Paging to a Group of Users in a Network Environment," Inventors: Maulik Vijay Vaidya, et al.
U.S. Appl. No. 14/612,794, filed Feb. 3, 2015, entitled "System and Method for Providing Collaborative Neighbor Management in a Network Environment," Inventors: Nigel Edward Warbuton, et al.
U.S. Appl. No. 14/597,036, filed Jan. 14, 2015, entitled "System and Method for Providing Collision-Avoided Physical Downlink Control Channel Resource Allocation in a Network Environment," Inventors: Qing Zhao, et al.
U.S. Appl. No. 14/612,827, filed Feb. 3, 2015, entitled "System and Method for Providing Policy Charging and Rules Function Discovery in a Network Environment," Inventors: Konstantin Livanos, et al.
U.S. Appl. No. 14/614,500, filed Feb. 5, 2015, entitled "System and Method for Providing Policy Charging and Rules Function Discovery in a Network Environment," Inventors: Konstantin Livanos, et al.
"TR-196 Femto Access Point Service Data Model," Broadband Forum Technical Report, Issue 2, Issue Date: Nov. 2011, © The Broadband Forum. All Rights Reserved; 46 pages.
"TR-069 CPE WAN Management Protocol," Broadband Forum Technical Report, Issue: 1 Amendment 4, Issue Date: Jul. 2011, Protocol Version 1.3, © The Broadband Forum. All Rights Reserved; 190 pages.
Adrangi, F., et al., "Chargeable User Identity," Network Working Group RFC 4372, Jan. 2006, 10 pages.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"Paging Channel Selection," UMTS World; first published on or about Jun. 22, 2003; 3 pages http://www.umtsworld.com/technology/paging.html.
Holbrook, H., et al., "Source-Specific-Multicast for IP," Network Working Group RFC 4607, Aug. 2006.
Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-ccc-allocation.html.
"PDCCH Processing," published by Gio Zakradze on Dec. 29, 2014; 56 pages.
"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.

* cited by examiner

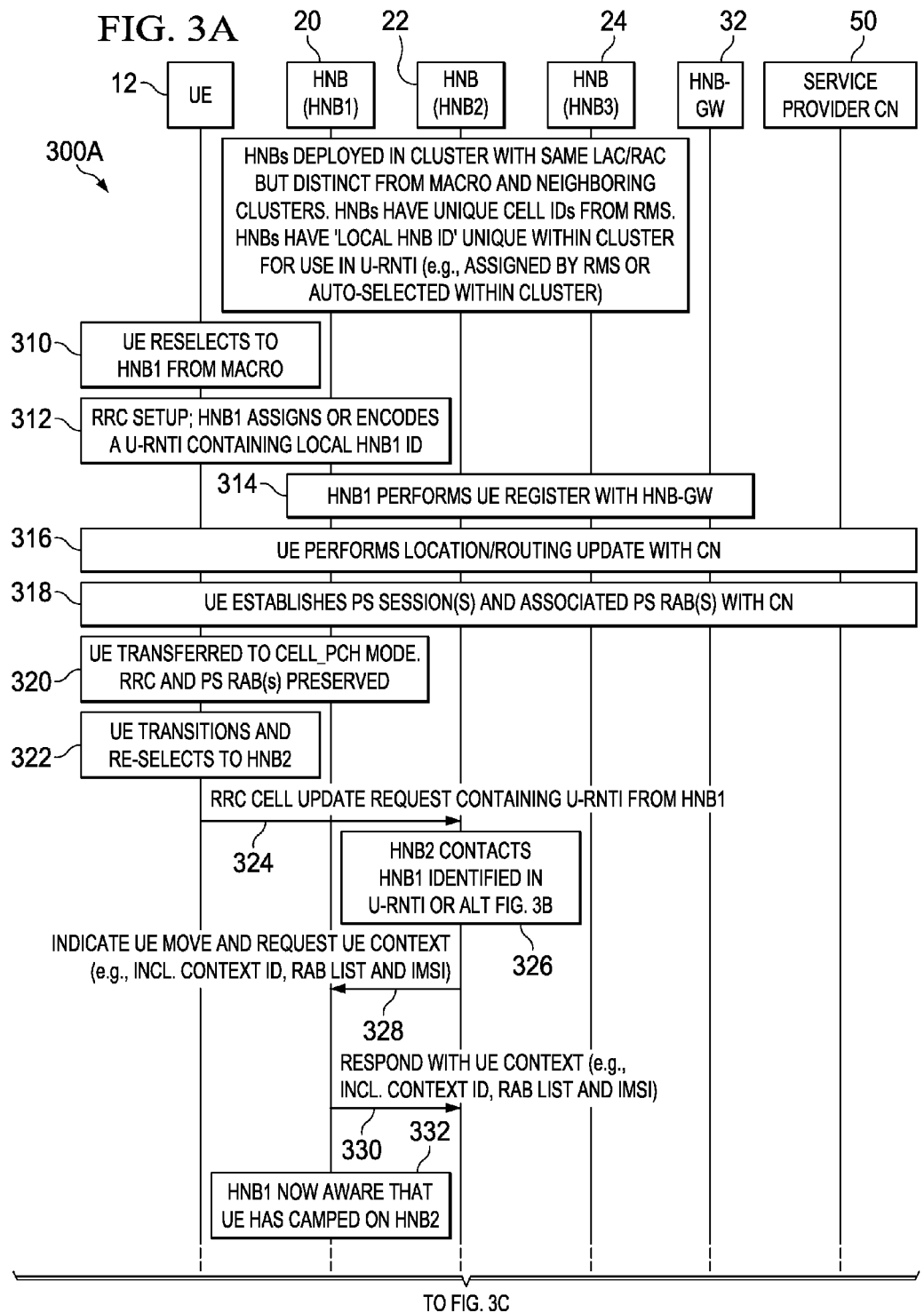

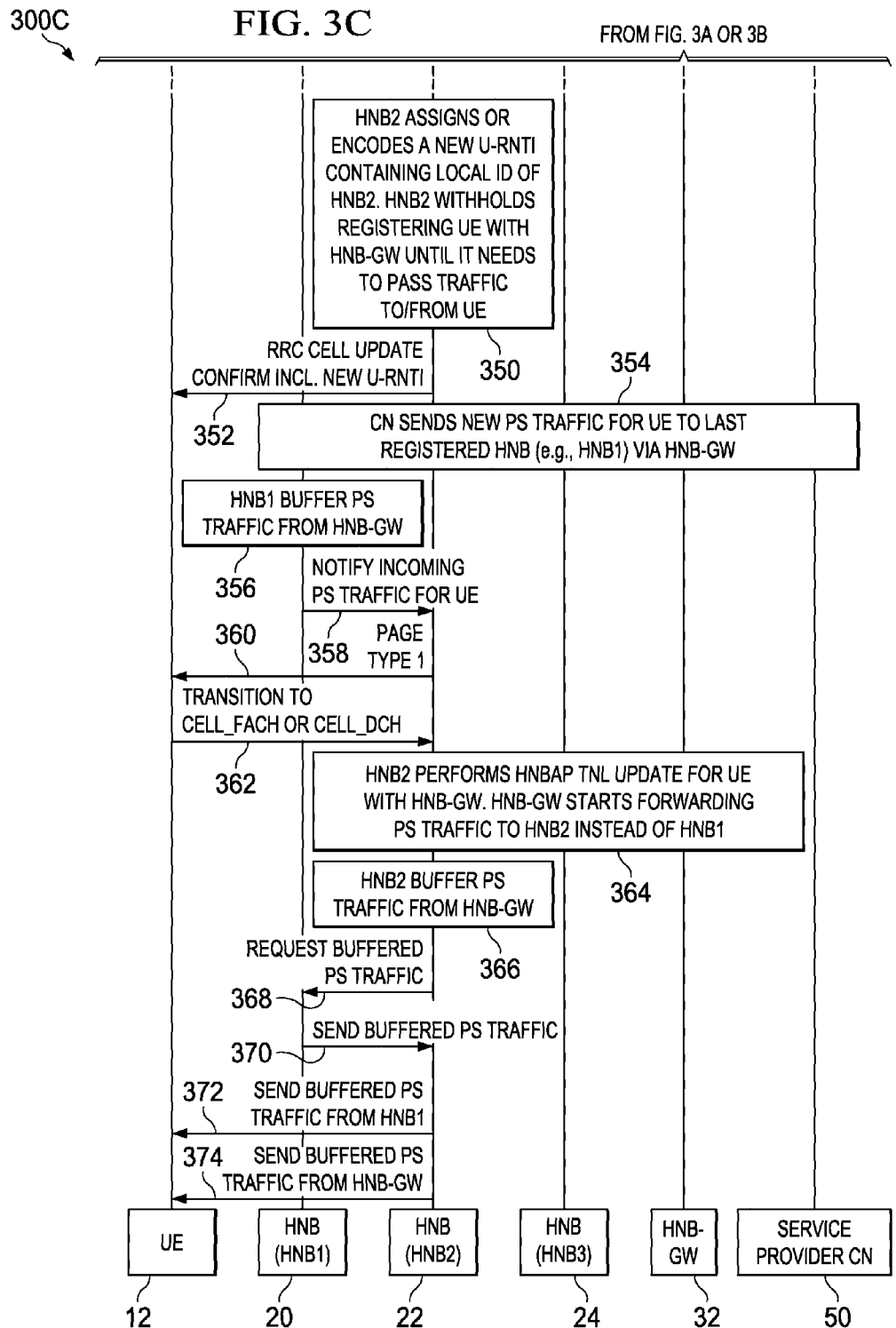

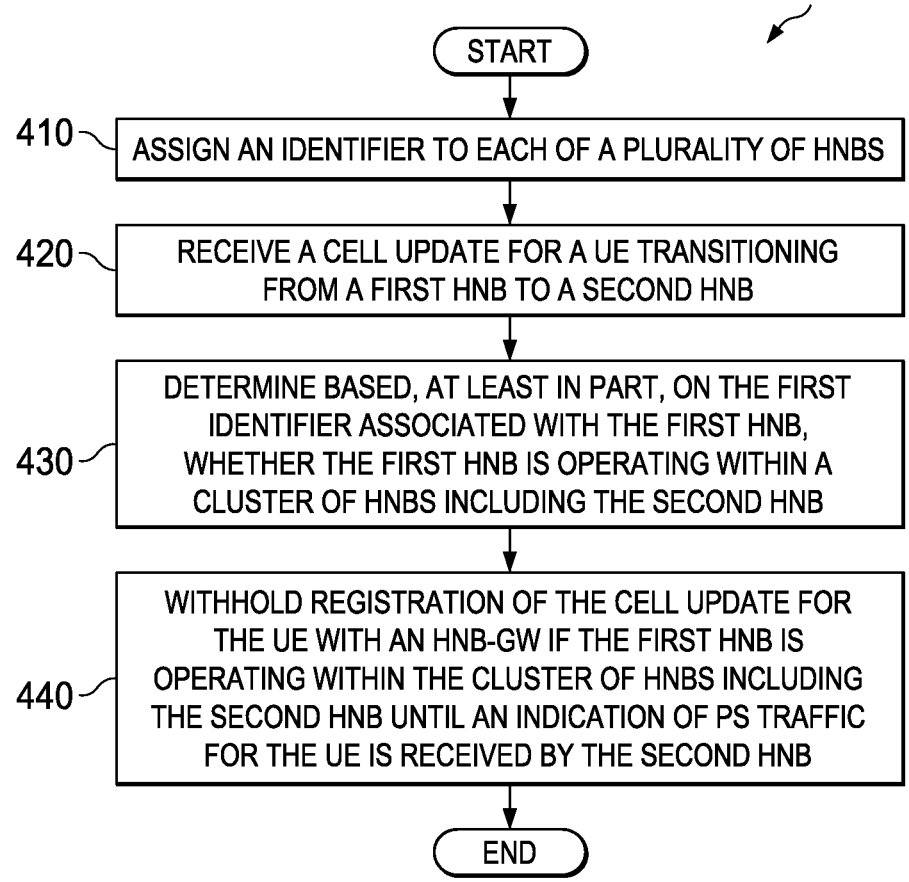

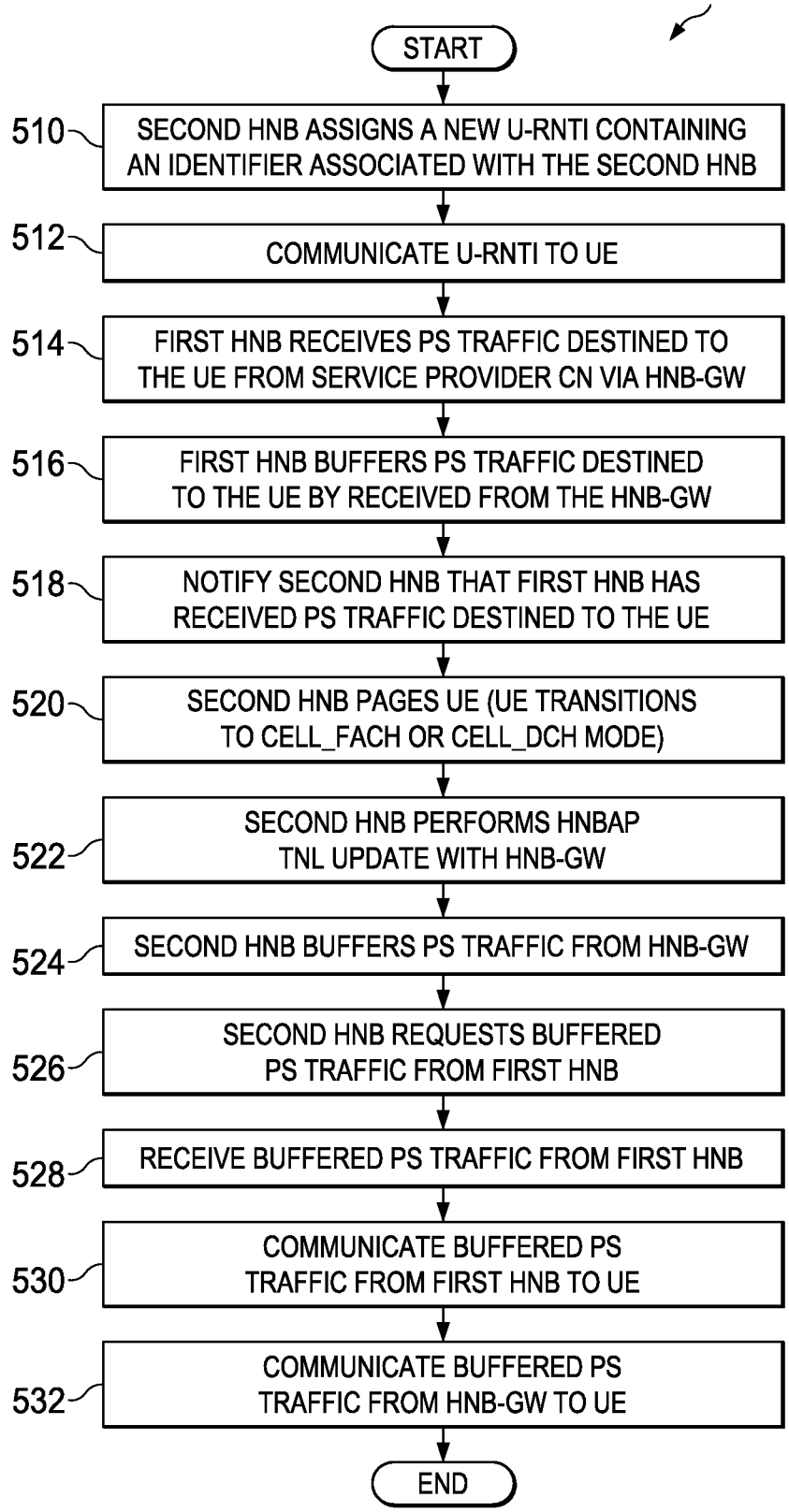

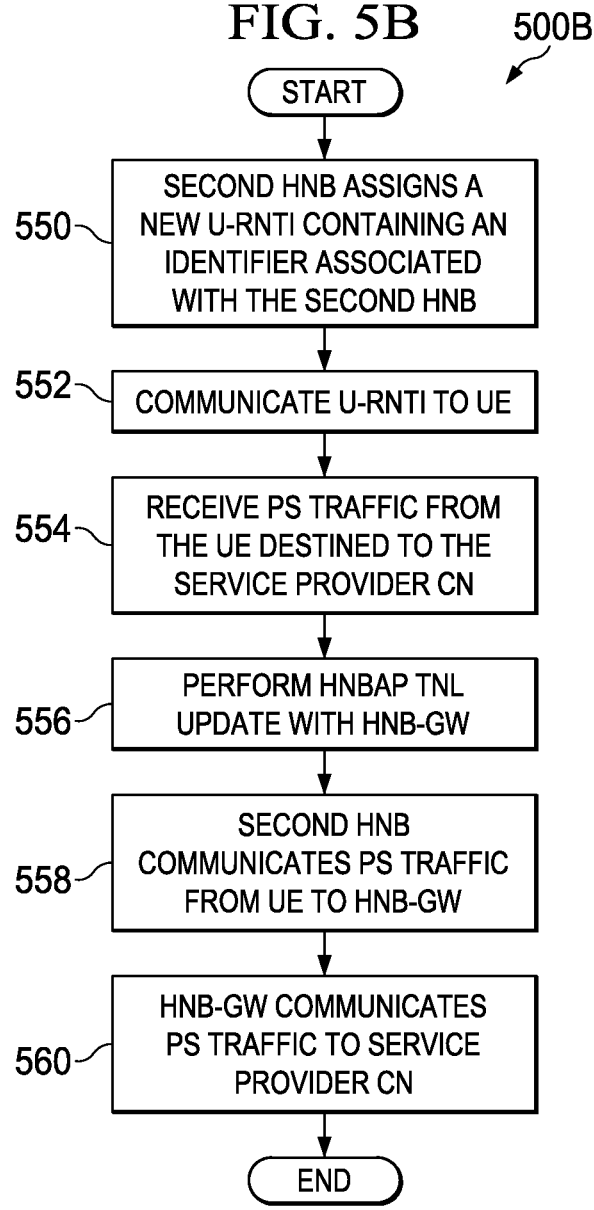

SYSTEM AND METHOD FOR SUPPORTING CELL UPDATES WITHIN A SMALL CELL CLUSTER FOR IDLE MOBILITY IN CELL PAGING CHANNEL MODE

TECHNICAL FIELD

This disclosure relates in general to the field of communications and, more particularly, to a system and method for supporting cell updates within a small cell cluster for mobility in cell paging channel (PCH) mode.

BACKGROUND

Networking architectures have grown increasingly complex in communication environments. For example, small cells have gained notoriety due to their capabilities to connect wireless devices to a network. In general terms, small cell access points can operate in a licensed spectrum to connect user equipment to the network, often using broadband connections. For a mobile operator, small cell access points can offer improvements to both coverage and capacity, which is particularly applicable to indoor networking environments where macro cell networks typically suffer coverage limitations. Small cell access points can also offer an alternative networking architecture to deliver the benefits of scalable small cell deployments. However, there are significant challenges in managing cell updates for mobile subscribers transitioning between small cells, particularly in the context updating a small cell gateway each time a small cell update is received by a small cell access point from a user equipment (UE), which can overload resources of the small cell gateway when many UE are transitioning within a particular small cell deployment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3C are simplified flow diagrams illustrating example flows and activities associated with supporting cell updates within a small cell cluster for mobility in cell PCH mode in accordance with one potential embodiment of the present disclosure;

FIG. 4 is a simplified flow diagram illustrating example operations associated with one embodiment of the present disclosure; and FIGS. 5A-5B are simplified flow diagrams illustrating other example operations associated with various embodiments of the present disclosure.

DETAILED DESCRIPTION OF EXAMPLE EMBODIMENTS

Overview

Figure 1:
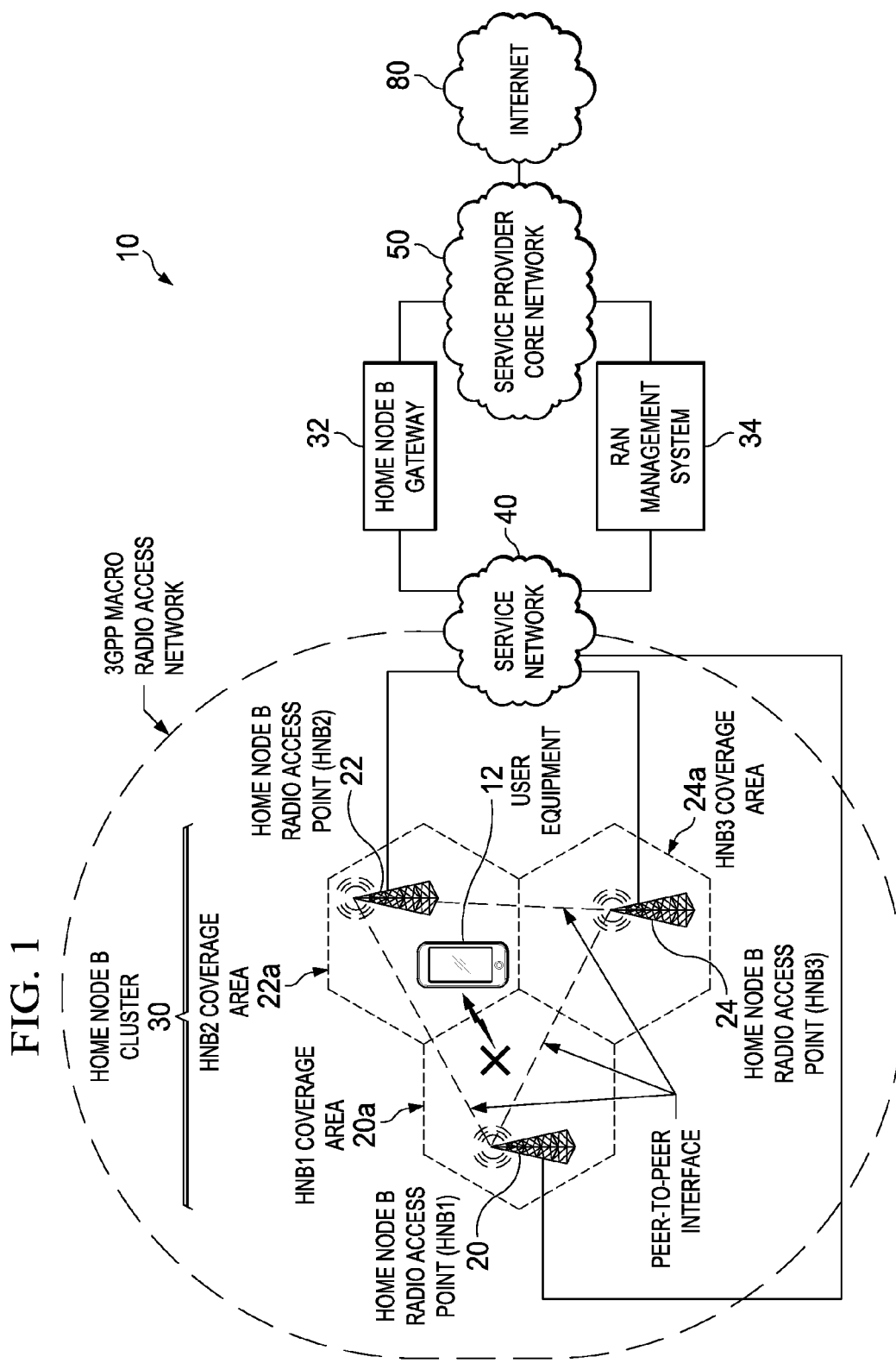
FIG. 1 is a simplified block diagram illustrating a communication system to facilitate supporting cell updates within a small cell cluster for mobility in cell paging channel (PCH) mode according to one embodiment of the present disclosure.

A method for a communication network is provided in one example embodiment and may include assigning an identifier to each of a plurality of Home Node Bs (HNBs); receiving a cell update for a user equipment (UE) transitioning from a first HNB to a second HNB, wherein the cell update for the UE includes a first identifier associated with the first HNB and wherein the UE is in a cell paging channel (PCH) mode; determining based, at least in part, on the first identifier associated with the first HNB, whether the first HNB is operating within a cluster of HNBs including the second HNB; and withholding registration of the cell update for the UE with an HNB gateway (HNB-GW) if the first HNB is operating within the cluster of HNBs including the second HNB until an indication of packet switched (PS) traffic for the UE is received by the second HNB.

In some cases, the method can include completing the registration of the cell update for the UE with the HNB-GW if the first HNB is not operating within the cluster of HNBs including the second HNB. In other cases, the method can include completing the registration of the cell update for the UE with the HNB-GW if the first HNB is operating within the cluster of HNBs including the second HNB when PS traffic from the UE is received by the second HNB, wherein completing the registration includes performing a transport network layer (TNL) update with the HNB-GW.

In still other cases, the method can include completing the registration of the cell update for the UE with the HNB-GW if the first HNB is operating within the cluster of HNBs including the second HNB when a notification of PS traffic destined to the UE is received by the second HNB, wherein completing the registration includes performing a transport network layer (TNL) update with the HNB-GW. In still other cases, the method can include completing the registration upon receiving an indication of Circuit Switched (CS) traffic from the UE, wherein completing the registration include performing a transport network layer (TNL) update with the HNB-GW; and transferring one or more dormant PS Radio Access Bearers (RABs) by the HNB-GW to the second HNB. In some instances, the method can include communicating between the first HNB and the second HNB using a peer-to-peer (P2P) protocol to inform the first HNB that the UE has transitioned to the second HNB and to retrieve context information for the UE from the first HNB.

In still other cases, the method can include notifying the second HNB by the first HNB if the first HNB receives first PS traffic destined to the UE; performing a transport network layer (TNL) update with the HNB-GW by the second HNB; buffering first PS traffic destined to the UE from the HNB-GW by the first HNB; communicating the first PS traffic to the second HNB; buffering second PS traffic destined to the UE from the HNB-GW by the second HNB; and communicating the first PS traffic and the second PS to the UE by the second HNB.

In some instances, the first identifier can be included in a Radio Network Temporary Identifier (RNTI) assigned by the first HNB. In some instances, the method can include communicating a cell update confirmation to the UE including a second identifier associated with the second HNB. In some instances, the second identifier can be included in a Radio Network Temporary Identifier (RNTI) assigned by the second HNB. In still other instances, assigning the identifier to each of the plurality of HNBs can include assigning a unique identifier to each of one or more HNBs operating in a particular cluster. In yet other instances, assigning the identifier to each of the plurality of HNBs can include assigning a same identifier to each of one or more HNBs operating in a particular cluster.

In still other instances, determining whether the first HNB is operating within the cluster of HNBs including the second HNB includes contacting the first HNB by the second HNB using a peer-to-peer (P2P) connection to determine context information for the UE in relation to the cluster of HNBs including the second HNB based, at least in part, on comparing the first identifier associated with the first HNB to a second identifier associated with the second HNB.

EXAMPLE EMBODIMENTS

Turning to FIG. 1, FIG. 1 is a simplified block diagram illustrating a communication system 10 to facilitate providing support for cell updates within a small cell cluster for mobility in cell paging channel (PCH) mode according to one embodiment of the present disclosure. This particular configuration may be tied to the 3rd Generation Partnership Project (3GPP) 3G architecture for Circuit Switched (CS) and Packet Switched (PS) services. Alternatively, the depicted architecture may be applicable to other environments equally. Note as used herein in this Specification, the terms 'cell PCH mode', 'CELL_PCH mode' and 'CELL PCH mode' can be referred to interchangeably.

The example architecture of FIG. 1 may include user equipment (UE) 12, Home Node B (HNB) radio access points 20, 22, 24, each of which may have a logical connection to an HNB gateway (HNB-GW) 32 and a Radio Access Network (RAN) Management System (RMS) 34 via a service network 40. HNB radio access points 20, 22, 24 may be operating in an HNB cluster 30 and may interface with each other via one or more peer-to-peer (P2P) interfaces utilizing a P2P protocol. Note the terms 'cluster' and 'grid' may be used interchangeably herein in this Specification. RMS 34 and HNB-GW 32 may further interface with a service provider core network (CN) 50, which may interface with an internet 80. As referred to herein in this Specification, a 'core network' may be referred to interchangeably as a 'service provider core network'. In various embodiments, RMS 34 may be deployed as an HNB Management System (HMS), as referenced in 3GPP standards.

As shown in FIG. 1, HNB 20 may provide a coverage area 20a, HNB 22 may provide a coverage area 22a and HNB 24 may provide a coverage area 24a, each of which may provide for cellular/mobile coverage for UE 12. The coverage areas 20a, 22a, 24a for each of HNBs 20, 22, 24, respectively, may overlap with each other as well as with a 3GPP Macro Radio Access Network, which may include access networks such as, for example, Global System for Mobile Communications (GSM) Enhanced Data Rates for GSM Evolution (EDGE) Radio Access Network (GERAN), generally referred to as 2G, and Universal Mobile Telecommunications System (UMTS) Terrestrial Radio Access Network (UTRAN), generally referred to as 3G, and/or evolved UTRAN (E-UTRAN), generally referred to as 4G, Long Term Evolution (LTE) or LTE-Advanced (LTE-A).

As referred to herein in this Specification, an HNB radio access point (e.g., HNB radio access points 20, 22, 24) may also be referred to interchangeably as an 'HNB', an 'HNB access point', a 'small cell', a 'small cell radio access point' or a 'small cell access point'. Note further that HNB 20 may be referred to herein in this Specification interchangeably as 'HNB1' through various example discussions; HNB 22 may be referred to herein in this Specification interchangeably as 'HNB2' through various example discussions; and HNB 24 may be referred to herein in this Specification interchangeably as 'HNB3' through various example discussions.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In various embodiments, service network 40 and internet 80 may include and/or overlap with one or more networks including a broadband IP network, a local area network (LAN), a wide area network (WAN), a wireless LAN (WLAN), a metropolitan area network (MAN), an Intranet, an Extranet, a virtual private network (VPN), or any other appropriate architecture or system that facilitates communications in a network environment. In various embodiments, service network 40 may overlap with or be included in internet 80.

Service provider CN 50 may include other elements, gateways, etc. that may make up 2G and 3G architectures for General Packet Radio Service (GPRS), CS services and PS services. For example, these elements may include, but not be limited to, one or more Mobile Switching Centers (MSCs), a Home Location Register (HLR), one or more serving GPRS support nodes (SGSNs), one or more gateway GPRS support nodes (GGSNs), one or more Policy and Charging Rules Functions (PCRFs) and/or one or more Authentication, Authorization and Accounting (AAA) elements. These elements, gateways, etc. may be included in CN 50 to provide various UE services and/or functions, such as, for example, to implement Quality-of-Service (QoS) on packet flows, to provide connectivity for UE 12 to external data packet networks (PDNs) (e.g., internet 80), to provision CS voice routing, to provide enhanced services such as enhanced charging, stateful firewalls and/or traffic performance optimization (TPO), etc. These elements are not shown in CN 50 in order to highlight other features of communication system 10.

Before detailing some of the operational aspects of FIG. 1, it is important to understand common characteristics of HNB radio access points and UE mobility as generally provided in commercial architectures. The following foundation is offered earnestly for teaching purposes only and, therefore should not be construed in any way to limit the broad teachings of the present disclosure. In many network architectures, HNBs can be deployed as autonomous units to improve reception in areas with poor coverage, or within buildings where coverage is reduced by the structure itself.

Essentially, HNBs are fully featured base stations that can provide proximate coverage in a business (e.g., enterprise) and/or residential environment. Typically, HNBs operate at lower radio power levels as compared to macro cells. Calls can be made and received, where the signals are sent (potentially encrypted) from an HNB via a service network (e.g., service network 40) to one of the service provider's main switching centers. HNBs can be provisioned to readily handle 8, 16, 32, etc. concurrent calls. Thus, an HNB generally operates as a mini tower for a proximate user. As used herein in this Specification, the terms 'user' and 'subscriber' may be used interchangeably.

HNBs can be deployed in business (e.g., enterprise) environments within predefined clusters or grids that can be optimized to provide contiguous or overlapping cellular/mobile coverage for enterprise users (e.g., employees, visitors, etc.) when such users are located within a coverage area of HNBs deployed in such an HNB cluster/grid. It is desirable to deploy small cells with support for 3G CELL_PCH mode. This mode is an alternative to IDLE mode, which allows inactive UE to preserve Radio Resource Control (RRC) connection(s) and packet switched (PS) Radio Access Bearer(s) (RAB(s)) without using any dedicated radio resources. A UE in CELL_PCH mode can then be paged when the network needs to transition it to an active state.

Compared to IDLE mode, CELL_PCH mode can improve user experience by, for example saving approximately 2-4 seconds of setup time. It can also reduce CN signaling for RAB setup. UE battery use can also be reduced to near equivalent of IDLE mode usage depending on discontinuous reception (DRX) timers for paging. An additional benefit is the ability to track 'idle' UE movement for location purposes because, in CELL_PCH mode, a given UE has to perform an RRC Cell Update whenever it measures a cell with a stronger cell Identity (ID).

When deploying small cells, moves of inactive UE in CELL_PCH mode within an enterprise grid can cause constant external updates to the HNB-GW interfacing with the small cells. Since enterprise small cell grids or clusters can be deployed with a common Location Area Code (LAC) and/or routing area code (RAC) to avoid signaling to the CN, no Location Update procedure and/or routing update procedure may be performed for a given inactive UE transitioning between small cell access points (APs). However, performing an RRC Cell Update procedure for a given small cell AP and a corresponding UE Register on the HNB-GW on every Cell transition by inactive UE can present excessive loads on the HNB-GW. The transitioning can also present an additional load on the small cell AP to perform an IMSI identity procedure for the transitioning UE.

The CELL_PCH mode has been successfully deployed for macro radio access networks. However, with very small areas of coverage for small cells, there can be an unprecedented level of signaling involved between small cell APs, the HNB-GW and the CN, making CELL_PCH mode potentially unusable with small cell deployments.

In accordance with one embodiment, communication system 10 can overcome the aforementioned shortcomings (and others) by providing a solution for locally handling Cell Updates within a small cell cluster/grid. For example, communication system 10 can include HNBs 20, 22, 24 in a cluster (e.g., HNB cluster 30) to complete Cell Update procedures for a given UE (e.g., UE 12) in CELL_PCH mode locally without having to update HNB-GW 32 via a UE Register (e.g., using HNB Application Part (HNBAP) protocol).

In various embodiments, HNBs 20, 22, 24 can be preconfigured with the knowledge of their cluster/grid using one or more identifiers. In various embodiments, identifier configurations can include: each HNB in a given cluster/grid being configured with a particular 'local ID', locally unique to each HNB in the cluster/grid, and a common LAC; each HNB in a given cluster/grid being configured with a particular 'global ID' (e.g., globally unique to each HNB in the given cluster/grid or at least geo-area unique) and a common LAC; and/or each HNB in a given cluster/grid being configured with a particular 'cluster ID' or 'grid ID' unique to the cluster/grid and a common LAC.

HNBs 20, 22, 24 in HNB cluster 30 can communicate with each other directly using one or more P2P interfaces, as shown in FIG. 1. In various embodiments, HNBs 20, 22, 24 may be coordinated to assign (e.g., encode) a UTRAN Radio Network Temporary Identity (U-RNTI) for a given UE session (e.g., a UE 12 session) when the UE attaches to a given HNB in a manner that the U-RNTI may uniquely identify one or more of the following: the local HNB ID of the HNB within a cluster/grid (e.g., if configured with a local ID) to which the UE is attaching; the global HNB ID of the HNB within the cluster/grid (e.g., if configured with a global ID) to which the UE is attaching; and/or the cluster ID/grid ID (e.g., if configured with a cluster ID/grid ID) for the cluster to which the HNB belongs.

During operation, for example, when a given UE (e.g., UE 12) may establish an initial RRC connection with one of the HNBs, say, for example, HNB 20 (e.g., HNB1, as also referred to herein) in HNB cluster 30, it may be assigned a U-RNTI via HNB1 including, for example, a local ID for HNB1. Note, the present example describes a local ID for HNBs being included in the U-RNTI assignment, however, it should be understood that any ID type (e.g., global HNB ID, cluster ID/grid ID, etc.) can be included in the U-RNTI within the scope of the present disclosure.

HNB1 may register UE 12 with HNB-GW 32, and UE 12 may establish one or more PS RAB(s) with service provider CN 50. Subsequently, UE 12 may be pushed into CELL_PCH mode based on standard timers and/or thresholds configured for the UE.

When UE 12 in CELL_PCH mode may move to another HNB within HNB cluster 30, say, for example HNB 22 (HNB2, as also referred to herein), it may perform an RRC Cell Update procedure. HNB2 receiving the Cell Update may examine the U-RNTI, decode the local ID of HNB1 and contact HNB1 using a P2P grid protocol via one or more P2P interfaces to (a) inform that UE 12 moved and (b) retrieve context information for UE 12 (e.g., a context ID, a RAB list, an International Mobile Subscriber Identity (IMSI) for the subscriber associated with the UE, etc.).

In some cases, the context for UE 12 may not be found, which can occur for local HNB ID collisions across clusters/grids or if HNB1 reboots. If context for a given UE cannot be found, the Cell Update may be rejected forcing the UE to perform a re-register with HNB-GW 32. However, if context for UE 12 is found then HNB2 may complete the Cell Update for UE 12 without sending a UE Register to HNB-GW 32, which would otherwise be conventionally be expected in current small deployments, as discussed above.

PS traffic may be communicated between UE 12 and service provider CN 50. In one case, when traffic on a PS RAB for UE 12 arrives from CN 50, HNB-GW 32 may send it to HNB1 which is aware that UE 12 has moved to HNB2. HNB1 may buffer the traffic and may provide HNB2 with an indication that PS traffic has been received by HNB1 via a notification communicated to HNB2 indicating PS traffic present at HNB1. HNB2 may perform paging procedure as accustomed for CELL_PCH mode. In various embodiments, UE 12 may transition to cell forward access channel (CELL_FACH) mode or cell dedicated channel (CELL_DCH) mode on HNB2. HNB2 may perform an HNBAP transport network layer (TNL) update to HNB-GW 32 instructing it that UE 12 has moved and may buffer any traffic for UE 12 received from HNB-GW 32. This procedure may be the same procedure as used during HNB handover (HO) using an 'Iurh' protocol, as defined by 3GPP specifications. HNB2 may retrieve the buffered traffic from HNB1 and send it to UE 12 and may send buffered and new traffic from HNB-GW 32 to UE 12.

In another case, traffic for a PS RAB for UE 12 may be received by HNB2 from UE 12, which may be destined to service provider CN 50. In such as case, the indication of PS traffic for the UE may cause HNB2 to perform an HNBAP TNL update to HNB-GW 32 and send the PS traffic from UE 12 to service provider CN 50 via HNB-GW.

In other cases, the UE may need to make contact with service provider CN 50 for other purposes, such as, for example, to send or receive a CS voice call or a Short Message Service (SMS) text message, to perform a Location Update, etc. In these cases where HNB2 may receive an indication of CS traffic from UE 12, a TNL update could also be used to transfer one or more PS RAB(s) for UE 12 from HNB1 to HNB2, even though they may remain dormant. After the transfer of dormant PS RAB(s) to HNB2, UE 12 may perform one or more Non-Access Stratum (NAS) procedures with service provider CN 50 (e.g., send/receive a CS voice call, SMS text message or location update). While transfer of dormant RAB(s) may not reduce HNB-GW load in such cases, it may still offer CN (e.g., SGSN) load savings. For example, because the PS RAB(s) can be maintained they do not need to be re-established at a later time.

In various embodiments, the solution provided by communication system 10 may be adapted to handle cases of multiple UE 12 moves prior to becoming active again. For this reason, when an HNB, say for example, HNB1, receives traffic from HNB-GW 32 after being notified from another HNB that UE has moved, then HNB1 may need to query multiple HNBs to find the current UE home. Such queries are inexpensive from a resource perspective using the local P2P link (e.g., wired or wireless) and can be done concurrently to each of multiple HNBs in the cluster.

The solution provided by communication system 10 may provide several advantages over current small cell deployments that either do not support CELL_PCH mode or support CELL_PCH mode using conventional signaling techniques for signaling an HNB-GW on every inactive UE transition within a cluster/grid. For example, the solution provided by communication system 10 may provide that communication between HNBs in a cluster (e.g. an enterprise grid) can enhanced to handle CELL_PCH Cell Update locally, thus eliminating signaling to the HNB-GW for inactive UE moves. Further the solution provided by communication system 10 may enable deployment of CELL_PCH mode with small cells without increasing the signaling load on the HNB-GW and without demanding more from the backhaul between HNBs in a cluster and the HNB-GW.

Additionally, the solution provided by communication system 10 may leverage existing enterprise mobility grid and 'lurh' procedures for P2P communication between HNBs and U-RNTI management. Thus, the solution provided by communication system 10 may provide for realizing benefits of CELL_PCH mode including, for example, improving user session continuation time, reducing CN signaling, and providing for more efficient use of dedicated channels in comparison to small cell deployments which do not support CELL_PCH mode. In various embodiments, when encoding a U-RNTI with a unique cluster/grid ID instead of an HNB ID, ID collisions across grids may not be a concern and therefore discovery of UE context via broadcast can be deferred until a UE becomes active, providing an additional benefit for the solution provided by communication system 10. In various embodiments, when encoding a U-RNTI with a globally unique (or at least geo-area unique) HNB ID for each HNB in a cluster/grid, the solution provided by communication system 10 could also provide the benefit of deferring a UE context lookup until a UE becomes active.

In various embodiments, UE 12 can be associated with users, employees, clients, customers, etc. wishing to initiate a flow in communication system 10 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 10. UE 12 may also be inclusive of a suitable interface to a human user such as a microphone, a display, a keyboard, or other terminal equipment.

UE 12 may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12 may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

HNBs 20, 22, 24 can offer suitable connectivity to one or more UE (e.g., UE 12) using any appropriate protocol or technique. In general terms, HNBs 20, 22, 24 represent radio access point devices that can allow UEs to connect to a wired network using WiFi, Bluetooth™ WiMAX, 2G, 3G, or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (WLAN), an HNB, or any other suitable access device, which may be capable of providing suitable connectivity to a given UE. In certain cases, the access point can connect to a router (via a wired network), which can relay data between the UE and other UE of the network.

HNB-GW 32 may aggregate connectivity of HNBs 20, 22, 24 to service provider CN 50. In various embodiments, RMS 34 may be used to provision HNBs 20, 22, 24 according to technical report 069 (TR-069) protocol using the TR-196 version 2 data model or other such management protocol and/or data model. RMS may also be used to configure and/or manage HNB cluster 30 for HNBs 20, 22, 24, including, but not limited to, configuring HNB IDs (local or global), configuring cluster IDs, configuring HNB cell IDs, configuring LAC/RAC for the cluster, combinations thereof or the like.

Figure 2:
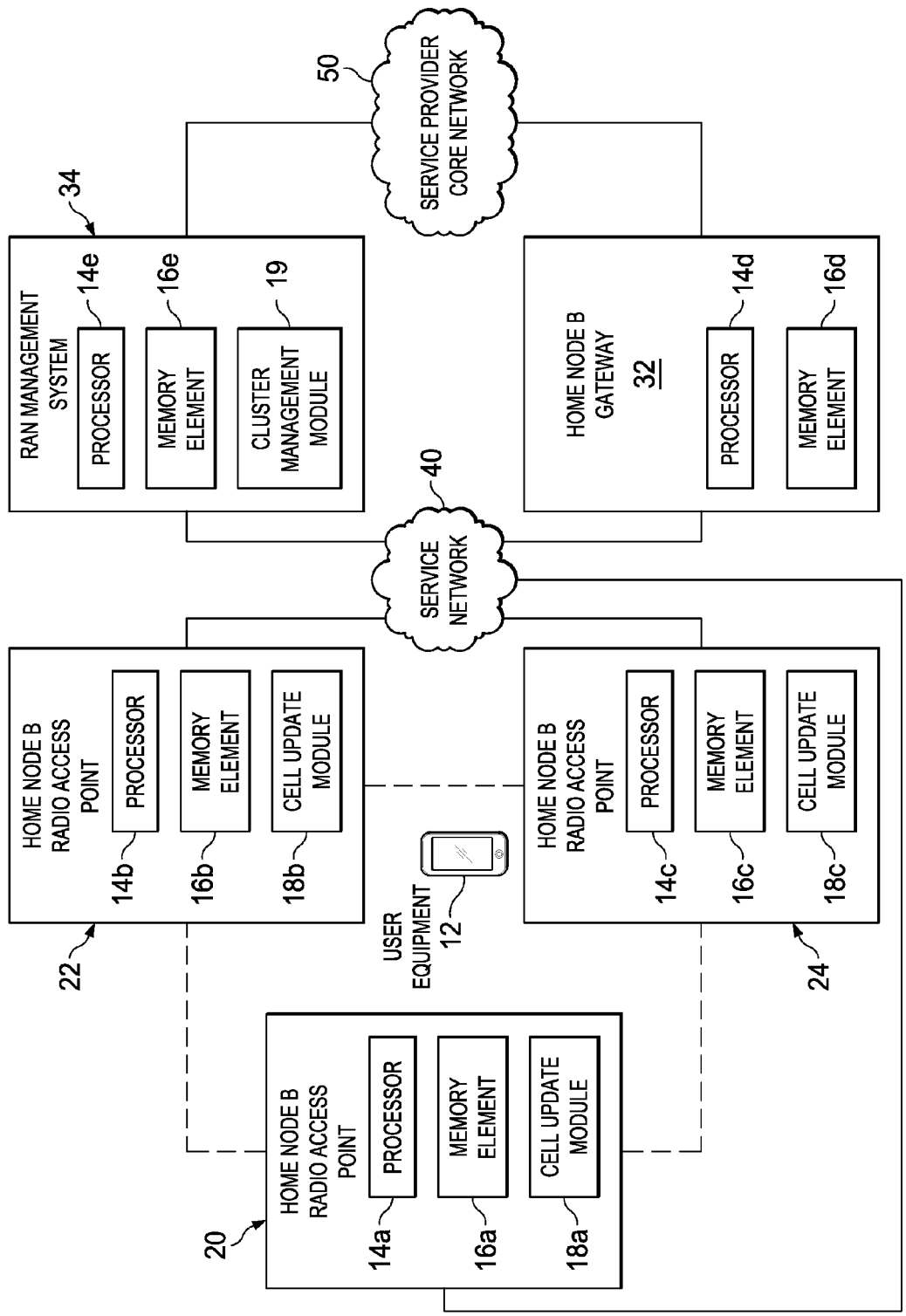
FIG. 2 is a simplified block diagram illustrating example details associated with one potential embodiment of the communication system.

Turning to FIG. 2, FIG. 2 is a simplified block diagram illustrating additional details associated with one potential embodiment of communication system 10. As shown in FIG. 2, HNBs 20, 22, 24 HNB-GW 32 and RMS 34 may each include a respective processor 14a-14e and a respective memory element 16a-16e. Additionally, HNBs 20, 22 and 24 may each further include a respective cell update module 18a-18c and RMS 34 may further include a cluster management module 19. Hence, appropriate software and/or hardware is being provisioned in HNBs 20, 22, 24 HNB-GW 32 and RMS 34 in order to facilitate supporting RRC Cell Updates within a small cell cluster for mobility in CELL_PCH mode. Note that in certain examples, certain databases (e.g., for storing identifiers such as local HNB IDs, global HNB IDs, cluster/grid IDs, cluster LAC/RAC, etc.) can be consolidated with memory elements (or vice versa), or the storage can overlap/exist in any other suitable manner.

In one example implementation, HNBs 20, 22, 24 HNB-GW 32 and RMS 34 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate supporting CELL_PCH mode (e.g., for networks such as those illustrated in FIG. 2). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of HNBs 20, 22, 24 HNB-GW 32 and RMS 34 can include memory elements for storing information to be used in achieving the Cell Update operations for supporting CELL_PCH mode, as outlined herein. Additionally, each of these devices may include a processor that can execute software or an algorithm to perform the Cell Update activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to HNBs 20, 22, 24 HNB-GW 32 and RMS 34 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the Cell Update functions as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Figure 3B:
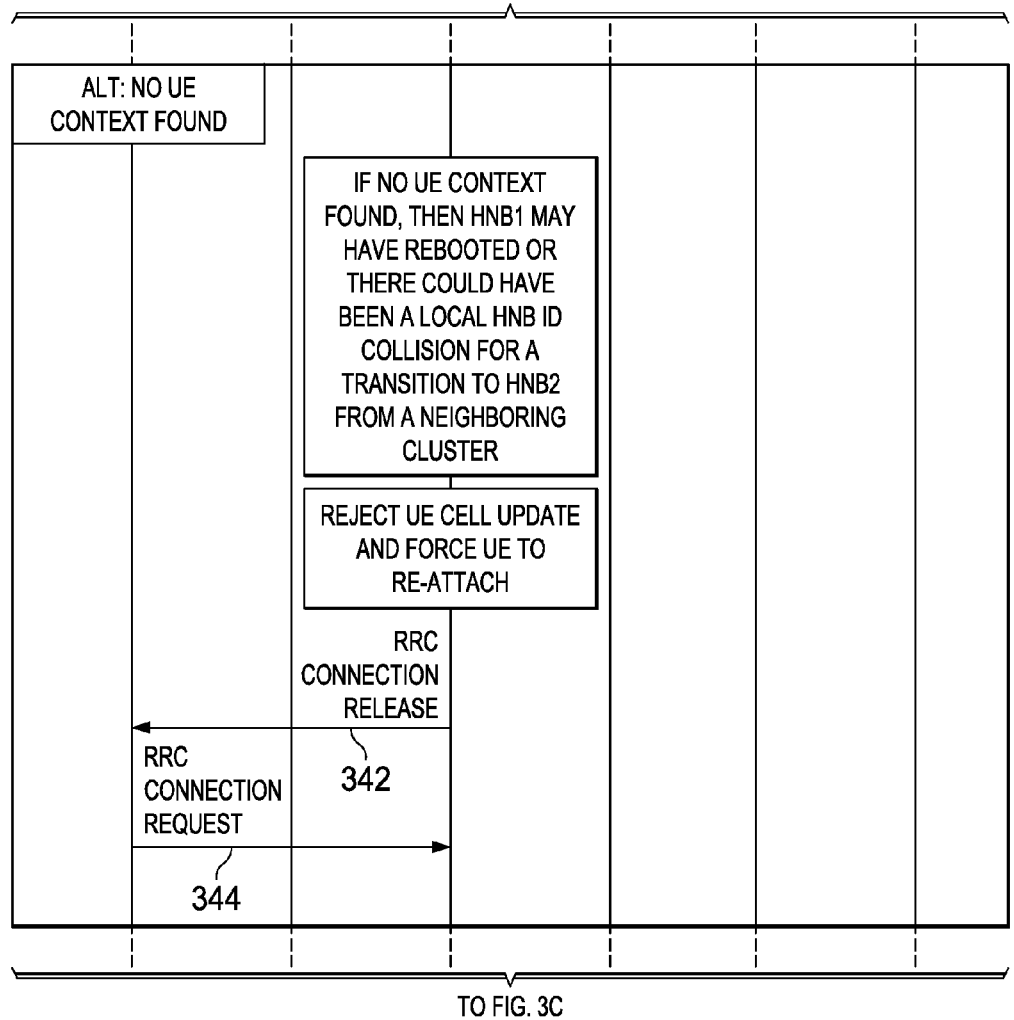

Referring to FIGS. 3A-3C, FIGS. 3A-3C are simplified flow diagrams 300A-300C that illustrate example flows and activities associated with supporting Cell Updates within a small cell cluster for mobility in CELL_PCH mode in accordance with one potential embodiment of communication system 10. In FIGS. 3A-3C, the flows of data and activities represented illustrate example flows of data between the components and example activities performed by certain components within communication system 10 including UE 12, HNB 20 (HNB1), HNB 22 (HNB2), HNB 24 (HNB3), HNB-GW 32 and service provider CN 50.

For FIGS. 3A-3C, it is assumed that HNB1, HNB2 and HNB3 are deployed in a cluster (e.g., HNB cluster 30) having a same LAC/RAC but distinct from macro cells operating in the 3GPP macro RAN and any neighboring small cell clusters. It is further assumed for the present example that HNB1, HNB2 and HNB each have unique cell IDS as assigned by RMS 34 and that each have been assigned a 'local HNB ID' unique within HNB cluster 30, which can be encoded in a U-RNTI by a corresponding HNB. In various embodiments, the local HNB ID can be assigned by RMS 34 or can be auto-selected by each HNB within the cluster.

As shown in flow diagram 300A for FIG. 3A, the flows and activities may begin at 310 when UE 12 reselects to HNB1 from a macro cell. At 312, an RRC setup may be performed between HNB1 and UE 12. During the RRC setup, HNB1 may assign (e.g., encode) a U-RNTI containing its local HNB1 ID and may communicate the U-RNTI to UE 12 via an RRC CONNECTION SETUP. At 314, HNB1 may perform a UE register with HNB-GW 32. At 316, UE 12 may perform a location/routing updated with service provider CN 50 and, at 318, UE 12 may establish one or more PS session(s) and associated PS RAB(s) with CN 50.

As shown at 320, UE 12 may be transferred to CELL_PCH mode and its RRC and PS RAB(s) may be preserved. At 322, UE 12 may transition locations within the cluster (e.g., a user associated with UE 12 may move to another floor, another office, another building, etc.) and may re-select to HNB2. At 324, UE 12 may communicate an RRC Cell Update request to HNB2 containing the U-RNTI assigned from HNB1 (e.g., containing the local HNB1 ID). At 326, HNB2 may contact HNB1 as identified in the U-RNTI received from UE 12. In some cases, however, HNB1 may not be identified (e.g., it may exist in another cluster different from the cluster including HNB2) or UE context may not be found (e.g., HNB1 may have rebooted). Processes for handling such cases are shown below in FIG.

3B. Returning to FIG. 3A, at 328, HNB2 may indicate the UE move to HNB1 and may request the context for UE 12. In various embodiments, UE context can include, but not be limited to a context ID for the UE, a RAB list for the UE and an IMSI for the subscriber associated with the UE. At 330, HNB1 may respond with the UE 12 context, including, for example, the context ID, RAB list and IMSI for UE 12. As shown at 332, HNB1 may now be aware that UE 12 has camped on HNB2.

Flow diagram 300B as shown in FIG. 3B illustrates alternate flows and activities in case no context may be found for UE 12. For example, if no UE context is found, this could mean that HNB1 may have rebooted or there could have been a local HNB ID collision for a transition to HNB2 from a neighboring cluster (e.g., HNB2 is unable to receive UE context as shown at 330). In such a case, HNB2 may reject the Cell Update from UE 12 and may force UE 12 to re-attach. Thus, at 342, HNB2 may communicate an RRC connection release to UE 12. At 344, UE 12 may communicate an RRC connection request to HNB2.

For either the case as shown in FIG. 3A, where the context for UE 12 may be found, or the case as shown in FIG. 3B, where the context for UE 12 may not be found, the flows and activities may continue to flow diagram 300C as shown in FIG. 3C. At 350, HNB2 may assign (e.g., encode) a new U-RNTI containing the local ID of HNB2. HNB2 may withhold registering UE 12 with HNB-GW 32 until it needs to pass PS traffic to/from UE 12. At 352, HNB2 may communicate an RRC Cell Update confirmation to UE 12 including the new U-RNTI.

As shown at 354, service provider CN 50 may send new PS traffic for UE 12 via HNB-GW 32 to the last registered HNB for the UE (e.g., HNB1). At 356, HNB1 may buffer the PS traffic from HNB-GW 32 and, at 358, may notify HNB2 of incoming PS traffic for UE 12. At 360, HNB2 may communicate a page type '1' (e.g., an IDLE mode page) to UE 12. At 362, UE 12 may transition to CELL_FACH or CELL_DCH mode on HNB2. At 364, HNB2 may perform an HNBAP TNL update for UE 12 with HNB-GW 32 and HNB-GW 32 may start forwarding PS traffic for UE 12 to HNB2 instead of HNB1.

As shown at 366, HNB2 may buffer the PS traffic for UE 12 from HNB-GW 32. At 368, HNB2 may request the buffered PS traffic from HNB1, and, at 370, HNB1 may respond to HNB2 with the buffered PS traffic. At 372, HNB2 may communicate the buffered traffic from HNB1 to UE 12, and, at 374, HNB2 may communicate the buffered traffic from HNB-GW 32 to UE 12.

Thus, as shown in FIGS. 3A-3C, communication system 10 may facilitate supporting Cell Updates for small cell clusters for mobility in CELL_PCH mode. Although the present example flows and activities illustrate PS traffic being sent from the CN destined to the UE, other flows and activities could be performed if, in another case, HNB2 were to receive PS traffic from UE 12 destined to the CN. In such a case, HNB2 could perform an HNBAP TNL update for the UE with HNB-GW 32 upon receiving PS traffic from the UE destined to CN 50 and could then forward the traffic to CN 50 via HNB-GW. Additionally, although flows and activities for FIGS. 3A-3C are described with respect to a UE 12 transition between HNB1 and HNB2, similar flows and activities could be performed for UE transitions between HNB1 and HNB3 and between HNB2 and HNB3 in a manner similar to those described above.

Further as noted, in various embodiments U-RNTI may be encoded with a unique grid or cluster ID rather than an HNB ID. If a U-RNTI is encoded with a unique grid or cluster ID, then when a new HNB receives Cell Update from a given UE, then it can perform a broadcast to discover which HNB in the cluster has the UE context. In such embodiments, concerns regarding ID collisions across grids may be reduced (e.g., because a unique grid/cluster ID for each grid/cluster can be assigned and/or managed via RMS 34) and discovery of UE context via broadcast can be deferred until the UE becomes active. In various embodiments, U-RNTI may be encoded with a globally unique HNB ID. In such embodiments, a similar benefit may be achieved in deferring UE context lookup until the UE becomes active. In various embodiments, it may also be possible to not encode any HNB or grid/cluster ID in a U-RNTI but rather broadcast query to all HNBs in a grid/cluster.

Referring to FIG. 4, FIG. 4 is a simplified flow diagram 400 illustrating example operations associated with one embodiment of communication system 10. In various embodiments, the operations may be performed by components within communication system 10 including UE 12, HNB 20 (e.g., HNB1), HNB 22 (e.g., HNB2), HNB 24 (e.g., HNB3), HNB-GW 32 and service provider CN 50. Processing may start at 410, when an identifier may be assigned to each of a plurality of HNBs (e.g., HNBs 20, 22, 24). In various embodiments, the identifier assigned to each of the plurality of HNBs can be a locally unique HNB identifier (e.g., an HNB ID local to HNB cluster 30) assigned to each of the particular HNBs; a globally unique HNB identifier (e.g., an HNB ID globally unique for each HNB as well as other HNBs for other potential neighboring clusters); or a grid/cluster ID shared by or common to each HNB in HNB cluster 30.

At 420, a Cell Update may be received for a given UE (e.g., UE 12) in a CELL_PCH mode transitioning from a first HNB (e.g., HNB 20) to a second HNB (e.g., HNB 22). The Cell Update may include a first identifier associated with the first HNB. In various embodiments, the first identifier may be encoded in a U-RNTI assigned by the first HNB. At 430, the second HNB may determine, based at least in part on the first identifier associated with the first HNB, whether the first HNB is operating within a cluster of HNBs that includes the second HNB (e.g., whether HNB 20 is operating within HNB cluster 30 including HNB 22). In various embodiments, the determining can include performing a look-up on the first identifier to determine whether the first HNB is operating within the same cluster and/or can include attempting to contact the first HNB by the second HNB using a P2P connection.

At 440, the second HNB may withhold registration of the Cell Update for the UE with an HNB-GW (e.g., HNB-GW 32) if the first HNB is operating within the cluster of HNBs including the second HNB until an indication of PS traffic for the UE is received by the second HNB. In various embodiments, the indication of PS traffic for the UE can include the second HNB receiving a notification from the first HNB indicating that PS traffic destined to the UE has been received by the first HNB from a service provider CN (e.g., service provider CN 50) via the HNB-GW or can include the second HNB receiving PS traffic from the UE itself destined to the service provider CN.

In one instance, the first HNB may receive PS traffic destined to the UE from the service provider CN. In another instance, the second HNB may receive PS traffic from the UE destined to the service provider CN. Referring to FIGS. 5A-5B, FIGS. 5A-5B 4 are simplified flow diagrams 500A-500B illustrating example operations associated with various embodiments of communication system 10. In various embodiments, the operations may be perform by components within communication system 10 including UE 12, HNB 20 (e.g., HNB1), HNB 22 (e.g., HNB2), HNB 24 (e.g., HNB3), HNB-GW 32 and service provider CN 50.

For the operations illustrated in flow diagrams 500A-500B, it is assumed that a given UE (e.g., UE 12) has transitioned from a first HNB (e.g., HNB 20) to a second HNB (e.g., HNB 22) and that the second HNB has determined a context of the UE from the first HNB (e.g., the first and second HNBs are operating in the same cluster, for example, HNB cluster 30). Flow diagram 500A, as shown in FIG. 5A illustrates example operations associated with an instance where, following the transition and UE context determination, the first HNB receives traffic from a service provider CN (e.g., service provider CN 5) via an HNB-GW (e.g., HNB-GW 32). In contrast, flow diagram 500B, as shown in FIG. 5B illustrates example operations associated with another instance where, following the transition and UE context determination, the second HNB receives PS traffic from the UE destined to the service provider CN.

For FIG. 5A, processing may start following a determination that the first HNB is operating in the same cluster as the first HNB and a determination of UE context. Thus, the operations may begin at 510 where the second HNB may assign (e.g., encode) a new U-RNTI containing an identifier associated with the second HNB. In various embodiments, the identifier can be at least one of the following: a locally unique HNB identifier (e.g., an HNB ID for the second HNB local to HNB cluster 30); a globally unique HNB identifier (e.g., an HNB ID globally unique for the second HNB for the cluster to which the second HNB belongs as well as for other HNBs for other potential neighboring clusters); or a grid/cluster ID shared by or common to the second HNB and other HNBs for the cluster to which the second HNB belongs (e.g., the same grid/cluster ID as for the first HNB in the present example).

At 512, the second HNB may communicate the U-RNTI to the UE. At 514, the first HNB may receive PS traffic destined to the UE from the service provider CN via the HNB-GW. At 516, the first HNB may buffer the PS traffic destined to the UE received from the HNB-GW. At 518, the first HNB may notify the second HNB that it has received PS traffic destined to the UE. At 520, the second HNB may page the UE indicating a presence of traffic destined to the UE. At 522, the second HNB may perform an HNBAP TNL update with the HNB-GW.

Continuing to 524, the second HNB may buffer PS traffic received from the HNB-GW. At 526, the second HNB may request the buffered PS traffic from the first HNB and, at 528, the second HNB may receive the buffered traffic from the first HNB. At 530, the second HNB may communicate the buffered PS traffic received from the first HNB to the UE. At 532, the second HNB may communicate the buffered PS traffic received from the HNB-GW to the UE.

Turning to FIG. 5B, as noted above, flow diagram 500B shown in FIG. 5B illustrates example operations associated with an embodiment where, following the transition and UE context determination, the second HNB may receive PS traffic from the UE destined to the service provider CN. Similar to FIG. 5A, processing for FIG. 5B may start following a determination that the first HNB is operating in the same cluster as the first HNB and a determination of UE context. Thus, the operations may begin at 550 where the second HNB may assign (e.g., encode) a new U-RNTI containing an identifier associated with the second HNB. As noted previously, in various embodiments, the identifier can be at least one of the following: a locally unique HNB identifier (e.g., an HNB ID for the second HNB local to HNB cluster 30); a globally unique HNB identifier (e.g., an HNB ID globally unique for the second HNB for the cluster to which the second HNB belongs as well as for other HNBs for other potential neighboring clusters); or a grid/cluster ID shared by or common to the second HNB and other HNBs for the cluster to which the second HNB belongs (e.g., the same grid/cluster ID as for the first HNB in the present example).

At 552, the second HNB may communicate the U-RNTI to the UE. At 554, the second HNB may receive PS traffic from the UE destined to the service provider CN (e.g., UE transitions from CELL_PCH mode into CELL_FACH mode or CELL_DCH mode and begins transmitting traffic destined to the CN). Continuing to 556, the second HNB may perform an HNBAP with the HNB-GW and, at 558, the second HNB may communicate the PS traffic to the HNB-GW. At 560, the HNB-GW may communicate the PS traffic to the service provider CN.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding flows and activities have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for a communication network comprising:
assigning an identifier to each of a plurality of Home Node Bs (HNBs);
receiving a cell update for a user equipment (UE) transitioning from a first HNB to a second HNB, wherein the cell update for the UE includes a first identifier associated with the first HNB and wherein the UE is in a cell paging channel (PCH) mode;
determining based, at least in part, on the first identifier associated with the first HNB, whether the first HNB is operating within a cluster of HNBs including the second HNB; and
withholding registration of the cell update for the UE with an HNB gateway (HNB-GW) if the first HNB is operating within the cluster of HNBs including the second HNB until an indication of packet switched (PS) traffic for the UE is received by the second HNB.

2. The method of claim 1, further comprising:
completing the registration of the cell update for the UE with the HNB-GW if the first HNB is not operating within the cluster of HNBs including the second HNB.

3. The method of claim 1, further comprising:
completing the registration of the cell update for the UE with the HNB-GW if the first HNB is operating within the cluster of HNBs including the second HNB when PS traffic from the UE is received by the second HNB, wherein completing the registration includes performing a transport network layer (TNL) update with the HNB-GW.

4. The method of claim 1, further comprising:
completing the registration upon receiving an indication of Circuit Switched (CS) traffic from the UE, wherein completing the registration include performing a transport network layer (TNL) update with the HNB-GW; and
transferring one or more dormant PS Radio Access Bearers (RABs) by the HNB-GW to the second HNB.

5. The method of claim 1, further comprising:
completing the registration of the cell update for the UE with the HNB-GW if the first HNB is operating within the cluster of HNBs including the second HNB when a notification of PS traffic destined to the UE is received by the second HNB, wherein completing the registration includes performing a transport network layer (TNL) update with the HNB-GW.

6. The method of claim 1, further comprising:
communicating between the first HNB and the second HNB using a peer-to-peer (P2P) protocol to inform the first HNB that the UE has transitioned to the second HNB and to retrieve context information for the UE from the first HNB.

7. The method of claim 1, further comprising:
notifying the second HNB by the first HNB if the first HNB receives first PS traffic destined to the UE;
performing a transport network layer (TNL) update with the HNB-GW by the second HNB;
buffering first PS traffic destined to the UE from the HNB-GW by the first HNB;
communicating the first PS traffic to the second HNB;
buffering second PS traffic destined to the UE from the HNB-GW by the second HNB; and
communicating the first PS traffic and the second PS to the UE by the second HNB.

8. The method of claim 1, wherein the first identifier is included in a Radio Network Temporary Identifier (RNTI) assigned by the first HNB.

9. The method of claim 1, further comprising:
communicating a cell update confirmation to the UE including a second identifier associated with the second HNB.

10. The method of claim 9, wherein the second identifier is included in a Radio Network Temporary Identifier (RNTI) assigned by the second HNB.

11. The method of claim 1, wherein assigning the identifier to each of the plurality of HNBs includes assigning a unique identifier to each of one or more HNBs operating in a particular cluster.

12. The method of claim 1, wherein assigning the identifier to each of the plurality of HNBs includes assigning a same identifier to each of one or more HNBs operating in a particular cluster.

13. The method of claim 1, wherein determining whether the first HNB is operating within the cluster of HNBs including the second HNB includes contacting the first HNB by the second HNB using a peer-to-peer (P2P) connection to determine context information for the UE in relation to the cluster of HNBs including the second HNB based, at least in part, on comparing the first identifier associated with the first HNB to a second identifier associated with the second HNB.

14. One or more non-transitory tangible media encoding logic that include instructions for execution that, when executed by a processor, is operable to perform operations comprising:
assigning an identifier to each of a plurality of Home Node Bs (HNBs);
receiving a cell update for a user equipment (UE) transitioning from a first HNB to a second HNB, wherein the cell update for the UE includes a first identifier associated with the first HNB and wherein the UE is in a cell paging channel (PCH) mode;
determining based, at least in part, on the first identifier associated with the first HNB, whether the first HNB is operating within a cluster of HNBs including the second HNB; and
withholding registration of the cell update for the UE with an HNB gateway (HNB-GW) if the first HNB is operating within the cluster of HNBs including the second HNB until an indication of packet switched (PS) traffic for the UE is received by the second HNB.

15. The media of claim 14, further comprising:
completing the registration of the cell update for the UE with the HNB-GW if the first HNB is operating within the cluster of HNBs including the second HNB when PS traffic from the UE is received by the second HNB, wherein completing the registration includes performing a transport network layer (TNL) update with the HNB-GW.

16. The media of claim 14, further comprising:
completing the registration of the cell update for the UE with the HNB-GW if the first HNB is operating within the cluster of HNBs including the second HNB when a notification of PS traffic destined to the UE is received by the second HNB, wherein completing the registration includes performing a transport network layer (TNL) update with the HNB-GW.

17. The media of claim 14, further comprising:
communicating between the first HNB and the second HNB using a peer-to-peer (P2P) protocol to inform the first HNB that the UE has transitioned to the second HNB and to retrieve context information for the UE from the first HNB.

18. The media of claim 14, further comprising:
  notifying the second HNB by the first HNB if the first HNB receives first PS traffic destined to the UE;
  performing a transport network layer (TNL) update with the HNB-GW by the second HNB;
  buffering the first PS traffic destined to the UE from the HNB-GW by the first HNB;
  communicating the first PS traffic to the second HNB;
  buffering second PS traffic destined to the UE from the HNB-GW by the second HNB; and
  communicating the first PS traffic and the second PS to the UE by the second HNB, wherein the first identifier is included in a Radio Network Temporary Identifier (RNTI) assigned by the first HNB.

19. An apparatus, comprising:
  a memory element for storing data; and
  a processor that executes instructions associated with the data, wherein the processor and memory element cooperate such that the apparatus is configured for:
    assigning an identifier to each of a plurality of Home Node Bs (HNBs);
    receiving a cell update for a user equipment (UE) transitioning from a first HNB to a second HNB, wherein the cell update for the UE includes a first identifier associated with the first HNB and wherein the UE is in a cell paging channel (PCH) mode;
    determining based, at least in part, on the first identifier associated with the first HNB, whether the first HNB is operating within a cluster of HNBs including the second HNB; and
    withholding registration of the cell update for the UE with an HNB gateway (HNB-GW) if the first HNB is operating within the cluster of HNBs including the second HNB until packet switched (PS) traffic for the UE is received by the second HNB.

20. The apparatus of claim 19, further comprising:
  notifying the second HNB by the first HNB if the first HNB receives first PS traffic destined to the UE;
  performing a transport network layer (TNL) update with the HNB-GW by the second HNB;
  buffering the first PS traffic destined to the UE from the HNB-GW by the first HNB;
  communicating the first PS traffic to the second HNB;
  buffering second PS traffic destined to the UE from the HNB-GW by the second HNB; and
  communicating the first PS traffic and the second PS to the UE by the second HNB, wherein the first identifier is included in a Radio Network Temporary Identifier (RNTI) assigned by the first HNB.

* * * * *

UNITED STATES PATENT AND TRADEMARK OFFICE
CERTIFICATE OF CORRECTION

PATENT NO.           : 9,717,068 B2
APPLICATION NO.      : 14/481654
DATED                : July 25, 2017
INVENTOR(S)          : Mickael Graham et al.

It is certified that error appears in the above-identified patent and that said Letters Patent is hereby corrected as shown below:

On the Title Page

In item (54), in Column 1, in "Title", Line 3, before "MOBILITY" delete "IDLE".

On the Page 3, in Column 1, under "Other Publications", Line 37, delete "Specificaton:" and insert -- Specification: --, therefor.

On the Page 4, in Column 1, under "Other Publications", Line 36, delete "Systems" and insert -- System --, therefor.

On the Page 4, in Column 1, under "Other Publications", Line 38, delete "signalling" and insert -- signaling --, therefor.

On the Page 5, in Column 1, under "Other Publications", Lines 34-35, delete "signalling" and insert -- signaling --, therefor.

In the Specification

In Column 1, Line 3, before "MOBILITY" delete "IDLE".

In Column 8, Line 8, delete "Droid™" and insert -- Android™ --, therefor.

In Column 8, Line 39, after "Bluetooth™" insert -- , --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*